United States Patent [19]

Franaszek

[11] Patent Number: 4,752,777
[45] Date of Patent: Jun. 21, 1988

[54] DELTA NETWORK OF A CROSS-POINT SWITCH

[75] Inventor: Peter A. Franaszek, Somers, N.Y.

[73] Assignee: International Business Machines Corporation, Armonk, N.Y.

[21] Appl. No.: 48,982

[22] Filed: May 12, 1987

Related U.S. Application Data

[63] Continuation of Ser. No. 713,117, Mar. 18, 1985, abandoned.

[51] Int. Cl.$^4$ .............................................. H04Q 1/00
[52] U.S. Cl. .............................. 340/825.79; 340/825.8
[58] Field of Search ............... 379/292, 306; 84/1.01, 84/1.03; 370/53, 54, 84, 104; 340/825.79–825.85, 825.02; 307/112, 113

[56] References Cited

U.S. PATENT DOCUMENTS

| | | | |
|---|---|---|---|
| 4,074,233 | 2/1978 | Swain | 84/1.01 |
| 4,147,894 | 4/1979 | Watanabe et al. | 370/104 X |
| 4,393,381 | 7/1983 | Seiden | 340/825.83 |
| 4,412,218 | 10/1983 | Niitsu | 340/365 S X |
| 4,518,960 | 5/1985 | Clark | 340/825.02 |
| 4,570,154 | 2/1986 | Kinghorn et al. | 340/365 S |

Primary Examiner—Ulysses Weldon
Attorney, Agent, or Firm—Sughrue, Mion, Zinn, Macpeak and Seas

[57] ABSTRACT

A switching system comprising a cross-point switch and a Delta network. The two switches are connected in parallel with common port adaptors. When a port desires a specified time reservation to another port, it sends a request message for the specified time over the Delta network to the requested adaptor at which a reservation processor grants a connection for completion at a fixed time in the future. The reservation grant is then returned via the Delta network to the requesting adaptor which, at the fixed time, sets the cross-point connection on the cross-point switch line associated with the requesting adaptor.

7 Claims, 9 Drawing Sheets

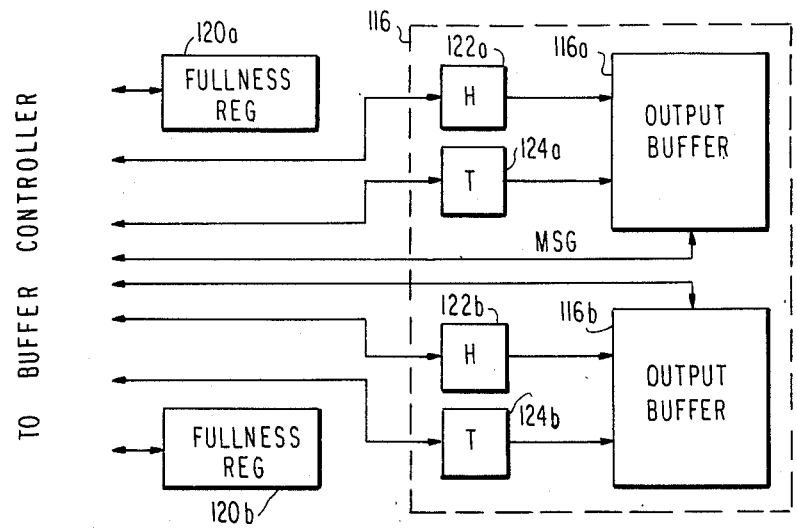
FIG. 8
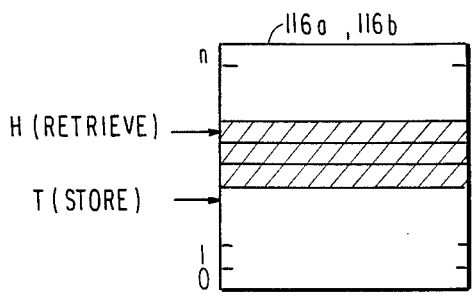
FIG. 9
FIG. 10
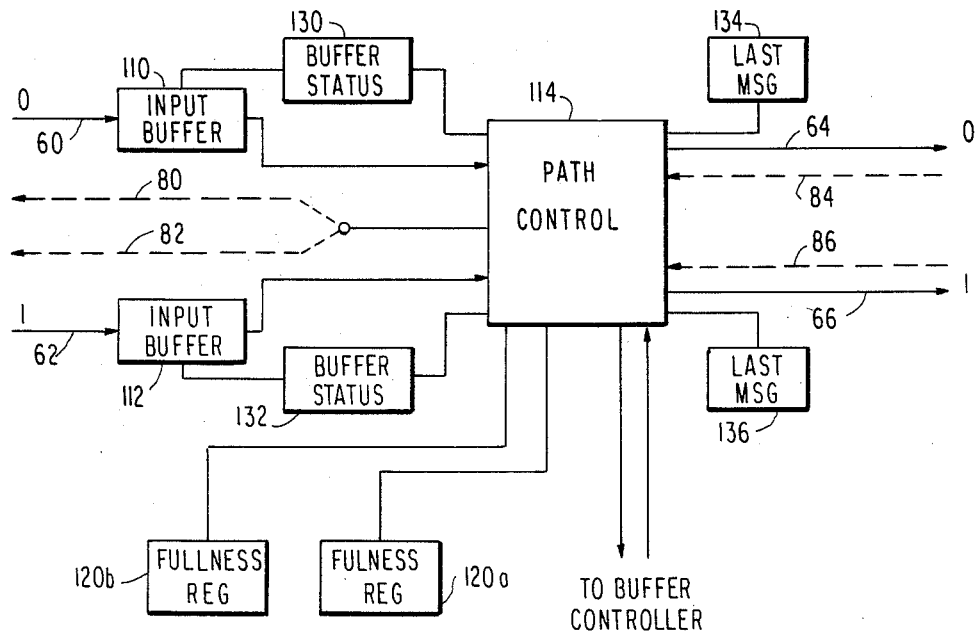

FIG. 11
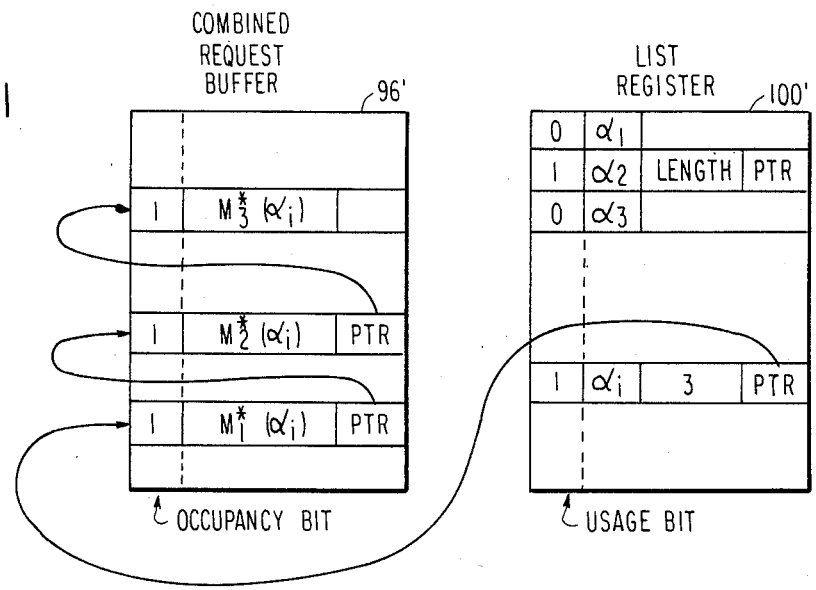
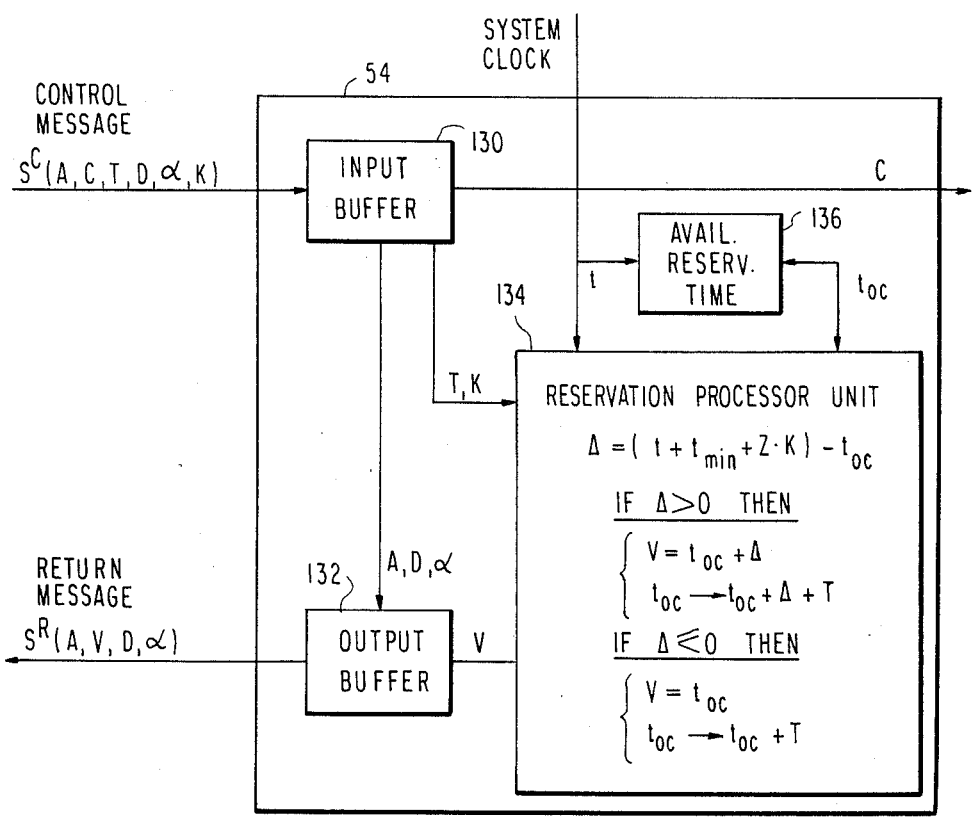
FIG. 12

DELTA NETWORK OF A CROSS-POINT SWITCH

This is a continuation of application Ser. No. 713,117, filed Mar. 18, 1985, now abandoned.

DESCRIPTION

1. Technical Field

The invention relates generally to multi-port switches. In particular, the invention relates to high throughput control for a wide band switch.

2. Background Art

Recent designs for high performance computers frequently involve the use of multiple devices, each operating independently, but occasionally communicating with one another or with memory devices when data needs to be exchanged. For instance, there may be multiple equivalent processors, operating in parallel and each of which requires occasional access to one of multiple memory devices. Both the processors and the memories may have one or, at most, a small number of input/output ports for the required data exchange to all the other processor and memories. The data exchanges occur frequently but at random times and occur between seemingly random combinations of processor and memory. Some kind of switching network is required to connect the ports for the relatively short period of the data exchange.

The computer system, however, puts demanding requirements upon the switching system. The switch must provide high bandwidth so that the processing is not unduly delayed while the data is being transferred. Furthermore, the connections are being frequently made and broken. As a result, delays that occur while waiting for a connection or delays incurred while the connection is being made can also impact the total capability of the parallel processors.

FIG. 1 is an illustration of one type of computer system being discussed here. There are a large number of processors 10, each operating independently and in parallel with each other. In the past, it has been common to have the number N or parallel processors to be in the neighborhood of 4. However, newer designs involve the number N increasing to 256 and perhaps 1,024. Each of the processors 10 occasionally requires access to one of several memories 12. For sake of illustration, the memories will be assumed to be equivalent and also of number N. Each processor 10 has an input/output path 14 and each memory 12 also has an I/O path 16. The paths 14 and 16 can be buses and may be duplicated to provide full-duplex communication. The important consideration, however, is that the a processor 10, requiring access to a particular memory 12, requires that is I/O path 14 be connected to the I/O path 16 of the required memory 12. This selective connection is performed by a switch 18, which is seen to be central to the design of the distributed processing of the computer system illustrated in FIG. 1. The use of a cross-point switch for the switch 18 provides the required high bandwidth. The important feature of a cross-point switch is that it can simultaneously provide N connections from one side to the other, each selectively made. Although the complexity of a crosspoint switch goes as $N^2$, the relative simplicity of the actual $N^2$ cross-points allows its fabrication in a currently available technology. C. J. Georgiou has described in U.S. patent application, Ser. No. 544,652, filed Oct. 24, 1983, now U.S. Pat. No. 4,605,928 a cross-point switch composed of an array of smaller cross-point switches, each on a separate integrated circuit. Although Georgiou describes a single-sided switch, as opposed to the double-sided switch of FIG. 1, Georgiou's switch can be used in the configuration of FIG. 1 or easily adapted thereto. With the cross-point switch of Georgiou, it is easily conceivable that the number N of ports to the switch can be increased to 1,024. Thus the total bandwidth of the switch 18 would be 1,024 times the bandwidth of the transmission paths 14 and 16. The cross-point of Georgiou has the further advantage of being non-blocking. By non-blocking is meant that if a processor 10 requires that its I/O path 14 be connected to the I/O path 16 of a memory 12 not currently connected, the switch 18 can provide that connection. Thus, a processor 10 is not blocked by the switch 18 when it requires a connection.

Georgiou has also described, in another U.S. patent application, Ser. No. 544,653, filed Oct. 24, 1983, now U.S. Pat. No. 4,630,045 a controller for his cross-point switch. Georgiou's controller is designed to be very fast but it suffers from the deficiency of most cross-point switches that one controller is used for all N input ports. As a result, the controller must sequentially service multiple ports requesting connection through the cross-point switch. Therefore, once the demanded connection rate exceeds the speed of the controller, the throughput of the combined cross-point switch and the controller falls as $N^{-1}$. That is, the controller is a shared resource. Even if the controller of Georgiou were redesigned to provide parallel subcontrollers, perhaps attached to each port, his parallel controller would nonetheless be depedent upon a single table, the port connection table of Georgiou's invention, that keeps track of available connections through the switch. Thus, the port connection table is also a shared resource and limits the controllers' speed for large values of N.

An alternative to the cross-point switch is the Delta network. Delta networks are defined, with several examples provided, by Dias et al. in a technical article entitled "Analysis and Simulation of Buffered Delta Networks" appearing in IEEE Transactions on Computers, Vol. C-30, No. 4, April 1981 at pp. 273-282. Patel also defines a Delta network in "Performance of Processor-Memory Interconnections for Multiprocessors", IEEE Transactions on Computers, Vol. C-30, No. 10, October 1981 at pp 771-780. An example of a Delta network for packet switching is described by Szurkowski in a technical article entitled "The Use of Multi-Stage Switching Networks in the Design of Iocal Network Packet Switching", 1981 International Conference on Communications, Denver, Colo. (June 14-18, 1981). The Delta network will be described here with reference to the Omega switching network, described by Gottlieb et al. in a technical article entitled "The NYU Ultracomputer--Designing and MIMD Shared Memory Parallel Computer", appearing in the IEEE Transactions on Computers, Volume C-32, No. 2, February 1983, at pages 175-189. This example of a Delta network is illustrated in FIG. 2. There are eight ports on the left, identified by a binary number and eight ports on the right, likewise identified by binary numbers. Connecting the right hand and the left hand ports are three stages of switches 20. Each switch 20 is a 2×2 switch that can selectively connect one of the two inputs on one side to one of the two outputs on the other side. It is seen that the illustrated Delta network can provide a connection from any port on the right hand side to any port on the left hand side. The Delta network is intended to be used in a parallel pipelined fashion. Data is transmitted from one side to another in relatively small packets. The packet contains, in addition to the data, control information, including the address of the desired destination. For instance, if the left-hand port 000 desires to send a packet of data to the right hand port 100, it includes the destination address 100 in the header of the packet and inputs the packet into the switch 20A. The switch 20A looks at the rightmost bit of the destination address and, as a result, sends both the destination address and the data part of the packet through its 0 output to switch 20B, the switch 20B looks at the middle bit of the destination address, a 0, and routes the package likewise through its 0 output to switch 20C. The switch 20C looks at the third or left-most bit of the destination address, a 1, and thus routes the packet through its 1 output to the right hand port 100. By use of buffers within the switches 20, it is possible to decouple the switches of the different sections so that the control and transmission are pipelined between the stages of the 2×2 switches 20. Thus the control function of the Delta network is potentially very fast and the delay introduced by the stages rises as log N rather than the N dependence of the cross-point switch. It is seen that the Delta network of FIG. 2 can provide parallel transmission paths, thus increasing the bandwidth of the system. However, the Delta network is a blocking network, that is, there is no guarantee that a connection path is available through a switch even if the desired output port is otherwise available. For instance, if the previously described connection between the 000 port on the left-hand side and the 100 port on the right-hand side is made, the left-hand port 001 is blocked from reaching the four right-hand ports 000, 010, 100 and 110. The previously described connections would need to be broken before the blocking is removed. Thus, a Delta network is potentially fast, but as traffic increases, blocking delays can be expected.

SUMMARY OF THE INVENTION

Accordingly, it is an object of this invention to provide a cross-point switch with high bandwidth.

It is a further object of this invention to provide a cross-point switch that is non-blocking for data transmission.

It is yet a further object of this invention to provide a cross-point switch for which the control functions do not severely slow for a large number of input and output ports.

The invention can be described as a switching system in which a cross-point switch provides high bandwidth, non-block connections for data transmission. Multiple controllers are provided at either the input or output ports for controlling the cross-point connections to that port. There is further provided a Delat network between the input and output ports that allow a pipelined switching of control information to or from the controllers. An access request to a port is granted on a reservation basis. That is, a control request is made over the Delta network requesting a fixed block of connection time. The controller receives these requests and sets up a schedule for connection and perhaps transmits back over the Delta network to the requesting port the time delay before its time connection will be honored.

BRIEF DESCRIPTION OF THE DRAWINGS

FIG. 8 is a detail schematic diagram of an alternate embodiment for the forward output buffer of a node.

FIG. 9 is an illustration of the memory organization of the output buffer of FIG. 8.

FIG. 10 is a schematic diagram of the forward path control of FIG. 7 and its associated components.

FIG. 11 is an illustration of the memory organization for an alternate embodiment of the combined request buffer and list register of FIG. 7.

FIG. 12 is a schematic diagram of the reservation processor.

DETAILED DESCRIPTION OF THE PREFERRED EMBODIMENTS OF THE INVENTION

Figure 3:
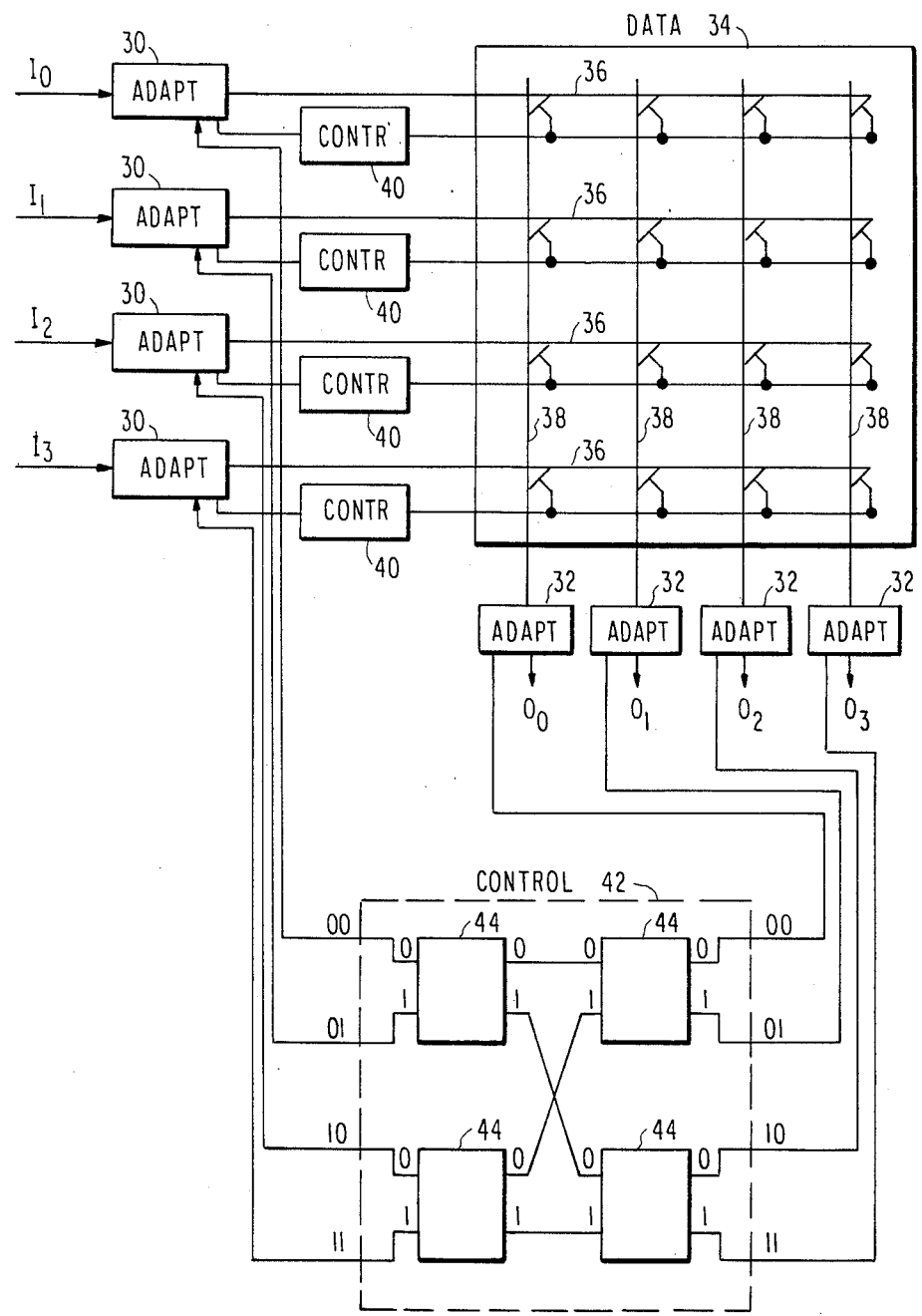
FIG. 3 is a schematic representation of the overall design for the switching network of the present invention.

This invention combines the best features of a cross-point switch and a Delta switching network by providing a non-blocking cross-point switch for data transmission and by additionally providing a Delta network switch for switching control information between the input and output ports of the cross-point switch. Parallel controllers of the cross-point switch are provided at each port of one of the sets of ports of the cross-point switch. FIG. 3 illustrates one embodiment of the invention when there are four input ports, $I_0$–$I_3$, and four output ports, $O_0$–$O_3$, that is, N=4. Each input port is connected to a respective input adaptor 30 and each output port is connected to an output adaptor 32. A cross-point switch 34 has four horizontal lines 36 connected to the input adaptors 30 and four vertical lines 38 connected to the output adaptors 32. At each intersection of a horizontal line 36 and a vertical line 38 is a cross-point that is individually selectable to make the connection between the respective horizontal line 36 and vertical line 38. A cross-point controller 40 is associated with each horizontal line 36 to control the cross-points of that horizontal line 36. This embodiment thus is horizontally partitioned because the controllers are associated with the input ports rather than the output ports. Each cross-point controller 40 is itself controlled by associated input adaptor 30.

Figure 1:
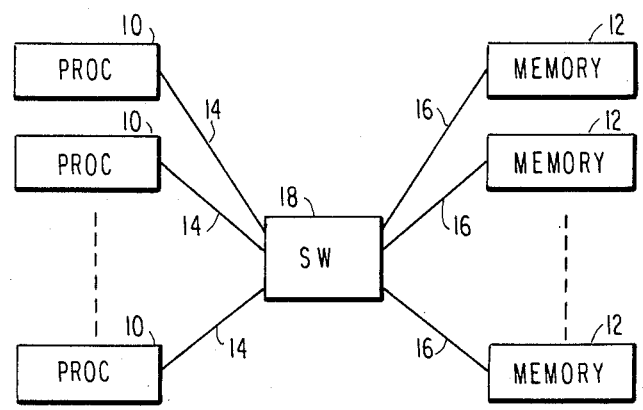
FIG. 1 is a general illustration of a multi-port switching system.
Figure 2:
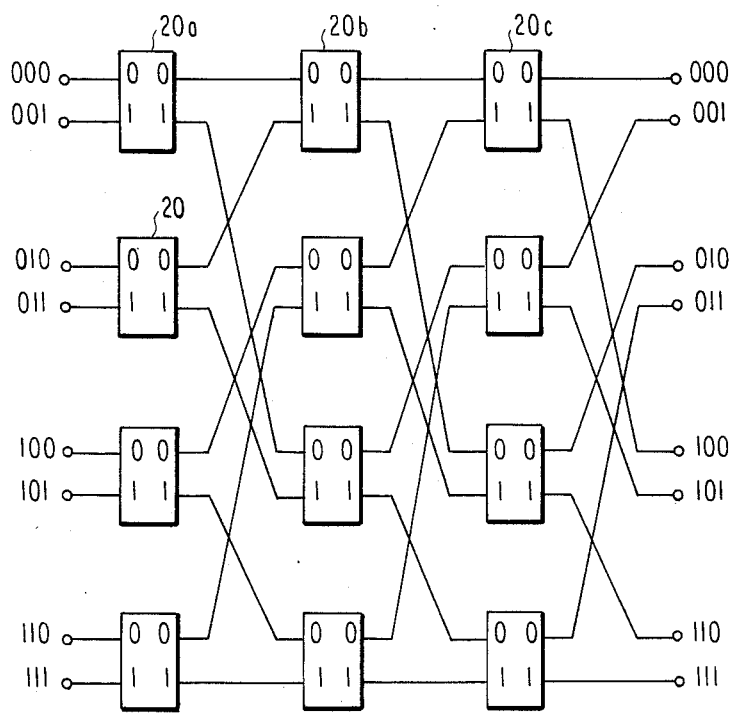
FIG. 2 is a schematic illustration of a Delta network.

The cross-point switch 34 is used primarily for the selective transmission of data while a separate Delta network 42 is used primarily for the selective transmission of control information between the input adaptors 30 and the output adaptors 32. For N=4, two stages, each with two 2×2, switches 44 are required. The Delta network differs from that of FIG. 2 because each switch 44 has its own buffering and the adaptors 30 and 32 also require buffering. The embodiment of FIG. 3 is presented for illustrative purposes and it is anticipated that the invention will be used primarily for considerably larger values of N, for example, 512 or 1024. For the more realistic embodiments, difficult to illustrate here, there would be additional stages of the 2×2 switches 44 and it is probable that the 2×2 switches 44 would be replaced by 4×4 switches or 8×8 switches. However, the basic configuration of the memory system would remain the same.

In some situations, it may be preferable to have the Delta network 42 to consist of three stages of four switches 44 in each stage. The right-most and left-most stage would consist of 1×2 switches. In this design, the buffering for the adaptors 30 and 32 can be performed by the 1×2 switches.

The fundamental problem in controlling a cross-point switch is to ascertain whether the desired resources are available, in this case, the required horizontal line 36 and vertical line 38 of the cross-point switch 34. The controller 40 of the horizontally-partitioned cross-point switch is easily able to decide if its associated horizontal line 36 is available. A much more difficult problem is for the controller 40 to know if the desired vertical line 38 is available or whether another controller 40 has connected a different cross-point to the desired vertical line 38. The Delta network 42 provides the fast and efficient means of obtaining this information.

When an input adaptor 30 receives a request from its input port $I_0$–$I_3$ for a connection to a designated output port $O_0$–$O_3$, the input adaptor 30 directs this request through the Delta network 42 to the designated output adaptor 32. The adaptor 32 keeps a record of the use of its associated vertical line 38.

The request that the input adaptor 30 transmits to the output adaptor is in the form of a control message $S^C_{ij}$ where i is the number of the input adaptor 30 and j is the number of the output adaptor 32 that is being requested. The form of the control message is $S^C_{ij}=(A_i,A_j,T,C)$. The first two parameters are the addresses or the numerical designations of the input adaptor 30 and the output adaptor 32 respectively. The second parameter T in the original request is the length of time that the i-th input adaptor 30 is requesting for connection to the j-th output adaptor 32. The third field C is a control field and may contain information such as the requested address to memory and whether the requested connection is for a read or write operation. The destination address $A_j$ is used for routing the control message $S^C_{ij}$ through the Delta network 42 to the designated output adaptor 32. The source address $A_i$ is used for routing a reply to that request back to the input adaptor 30 through the same Delta network 42.

As is described in the previously cited technical article by Gottlieb et al, it is possible to combine the fields of the source and destination addresses into a single field A. When the control message leaves the input adaptor 30, the address field A contains the destination address $A_j$. As the control message is switched through the Delta network 42, the switches 44 and 44 know on which input port to the respective switch the control message arrived. The number of the input port is one bit of the address of the requesting input adaptor 30. As a result, the switch 44 or 44 can replace one of the bits of the destination address $A_j$ with the number of the input port used with that switch. Thus, after the control message has traversed the Delta network 42 toward the output adaptor 32, the address field A contains the source address $A_i$. As will be explained later, it may be necessary to include an extra bit in the combined address field A. Of course, the combined field A provides a shorter control message, thus reducing the probability of a blocked node in the Delta network 42.

Figure 4:
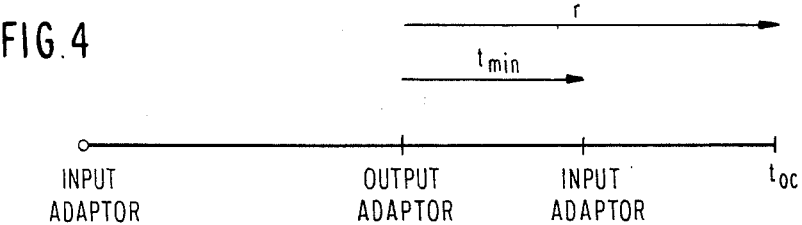
FIG. 4 is a time diagram illustrating the propagation of control message through the Delta network.

FIG. 4 is a time history that shows on the left the time required for the control message to be transmitted from the input adaptor 30 through the Delta network 42 to the output adaptor 32. This propagation time may involve delays at one or more switches 44 because the node is blocked. Each output adaptor 32 has a time register or reservation clock that shows the time $t_{oc}$ at which the output adaptor 32 will have completed processing all connection requests in its reservation queue. This time $t_{oc}$ is thus the time at which a new request can be honored. When the output adaptor 32 receives the control message $S^C_{ij}(A,T,C)$, it replaces the time field T in the control message by the reservation time V that is equal to $t_{oc}$ and increments the reservation clock by T. It is seen that the series of operations by the output adaptor 32 can be performed by the fetch-and-add operation described by Gottlieb. However, V is never allowed to have a value lower than $t_{min}$ where $t_{min}$ is the propagation time from the output adaptor 32 back to the input adaptor 30, assuming that there are minimal blocking delays within the Delta network 42. In this case, $t_{oc}$ is incremented by $t_{min}+T$.

The control message sent back to the input adaptor 30 is $S^R_{ij}(A,V)$. When the returned control message $S^R$ is received by the originating input adaptor 30, that adaptor knows the time V at which it can initiate the sending of the message to the respective output adaptor. When that time V arrives, the input adaptor 30 instructs its associated controller 40 to make the cross-point connection (ij) in the cross-point switch 34 and the input adaptor 30 then proceeds to send its message. At the same time, the output adaptor 32 has prepared itself to receive the message designated by the senior member of the reservation queue.

If the return control message was unduly delayed in the Delta network 42, the reservation time V may have already passed. If the reservation time V received by the input adaptor 30 has passed, as compared to the system clock, part of the reserved time has already expired at the output adaptor 32. Accordingly, it is impossible to transmit the entire desired message and the input adaptor 30 must make another request for the same data message.

It is seen that the cross-point controllers 40 are associated with the input ports and guarantee against a double use of the horizontal line 36. The output adaptors 32 guarantee, by means of the reservation, against a double use of the vertical lines 38.

Description of the previous embodiment is adequate for an understanding of the concept of the basic invention. However, it lacks detail as to the hardware necessary for an efficient Delta network. Furthermore, the efficiency of the Delta network can be a greatly increased in heavy traffic situations if control messages can be combined within the Delta Network when two or more input ports ports are sending control messages to the same output port. There is a high probability at any one time that one of the output ports is receiving a large number of control messages, at a faster rate than what it can handle. In such a situation, the node immediately associated with that output port must inhibit all other nodes connected to it from sending further control messages. If the buffering capabilities of the intermediate nodes are exceeded, the inhibition extends through a major part of the Delta network, thus blocking the transmission of control messages to other output ports. Thus, significant buffering should be provided at each of the nodes of the Delta network. Furthermore, to further limit blocking by a heavily used output port, it is advantageous to combine messages within the Delta network such that the output port needs only act upon a simple combined message and the decombining of the return control message is performed at the intermediate nodes of the Delta network which are operating in parallel and which do not have such an extended inhibiting effect in a blocking situation.

Figure 5:
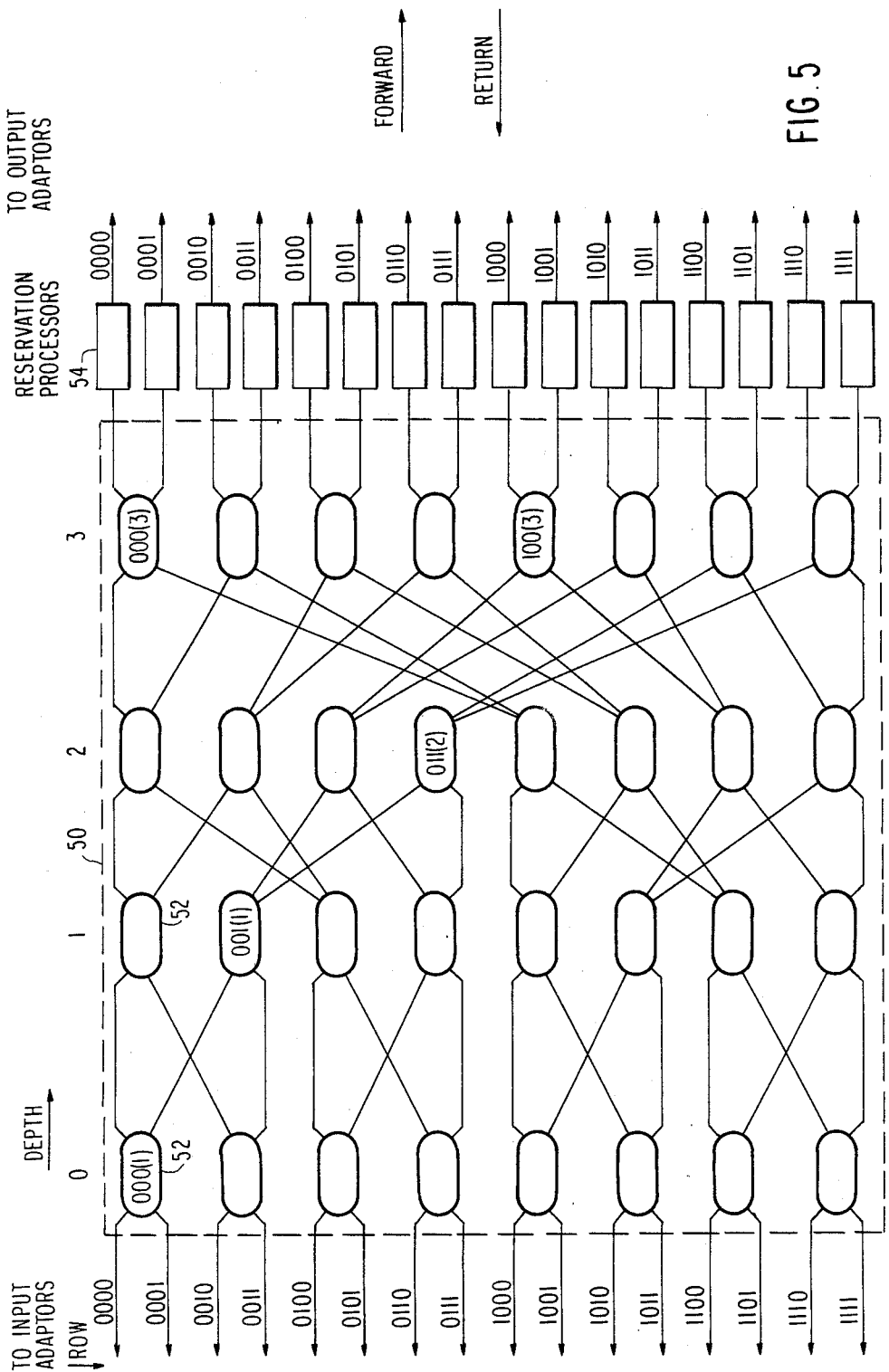
FIG. 5 is a schematic representation of a 16×16 Delta network.

FIG. 5 shows in 16×16 Delta network 50 connected to 16 input adaptors on the left-hand side and 16 output adaptors on the right-hand side. The Delta network 50 comprises four stages of nodes or switches 52, each stage identified by a depth from the input adaptors. The nodes are all 2×2 switches. The outputs of the nodes of depth 3 are connected to respective output adaptors through reservation processors 54, to be described later. The nodes 52 are arranged in rows and numbered from 000 to 111 according to the higher order bits of the input lines and a particular node can be identified by its row and its depth. For example, node 011(2) is in row 011 at a depth of 2.

The i-th input adaptor sends the control message $S^C_{ij}$ to the reservation processor 54 associated with the j-th output adaptor where $S^C_{ij}=(A,C,T,D,\alpha,K)$. The three added parameters, D, $\alpha$ and K, are required for the combining function. The first parameter A is the combined address field, previously described except for the inclusion of an extra bit. For example, a message from input adaptor 0001 intended for an output adaptor 0001 enters node 001(1) from input adaptor 0001 with an address of x0001. The extra left-hand bit is set to 1, i.e., 10001, by node 001(1) to indicate the input port from which it came. Note that after leaving node 000(1) only the three right-hand bits determine the subsequent path in the forward direction through the Delta network 50. The process is repeated until the message leaves node 000(3) for output adaptor 0001 at which point A=1000y. The address 1000 is the address of the input adaptor 0001 written in reverse order and the extra bit y is on the right.

The second parameter C contains control information, as described previously. For example, the control information might include the identifier of a line to be read from storage memory connected to the output adaptor. If the storage has 32 bit addresses (a typical situation in a main frame computer) and 128 byte lines, the storage would require 22 bits of addressing information in the control information C in order to identify the line. In addition to the line address, the control information C would include the type of operation to be performed, e.g., read or write. The inclusion of this operational information in the control message allows the accessing delays to the storage to overlap the delays introduced by the cross-point switch and the Delta network 50. This control information including an address is particularly useful when data is being accessed from a bulk memory on the destination side that is combined with a cache. The addressing information in the control message allows the data to be transferred or pre-fetched from bulk memory to the cache prior to the actual data access through the cross-point switch. For instance the address would be a line address for 128 bytes of data.

The control information C further contains an indicator as to whether the original control information was left behind in a message combining operation or, alternatively, an identifier of a message which was combined into a combined message that has the highest priority and thus retains the associated addressing information. The parameter T is the time required for the operation if there is no provision for overlapping of accessing delays and switching delays. In the simplest case, the connecting time T that is originally requested would be a single unit. e.g., the unit required to read one line of a memory. However, the parameter T could be increased if messages are combined at the intermediate node.

The remaining parameters, D, $\alpha$ and K, in the forward control message $S^C_{ij}$ are required for the combining operations at the nodes. The parameter D is one plus the depth within the Delta network 50 at which the most recent combining operation occurred. For example, D=3 if control messages were combined at node 110(2). Initially, D=0, i.e., no combining has yet been performed. This information is included so that, on the reply in the backward direction through the Delta network 50, a quick determination can be made as to whether the decombining needs to be performed. The parameter $\alpha$ is an identifier, inserted by a combining node, to identify for its own use the combining operation that produced the combined message. The combining nodes associate the identifier $\alpha$ with control messages retained in its own buffer. The parameter K is the number of nodes at which combining was done for a given message. When a control message has been combined, a reply message in the opposite direction must be decombined, thus producing a delay in the backward path. The parameter K is a measure for the delay for the highest priority message on the return path and serves to determine the earliest reservation time which could be used. Initially, K is set at zero.

Figure 6:
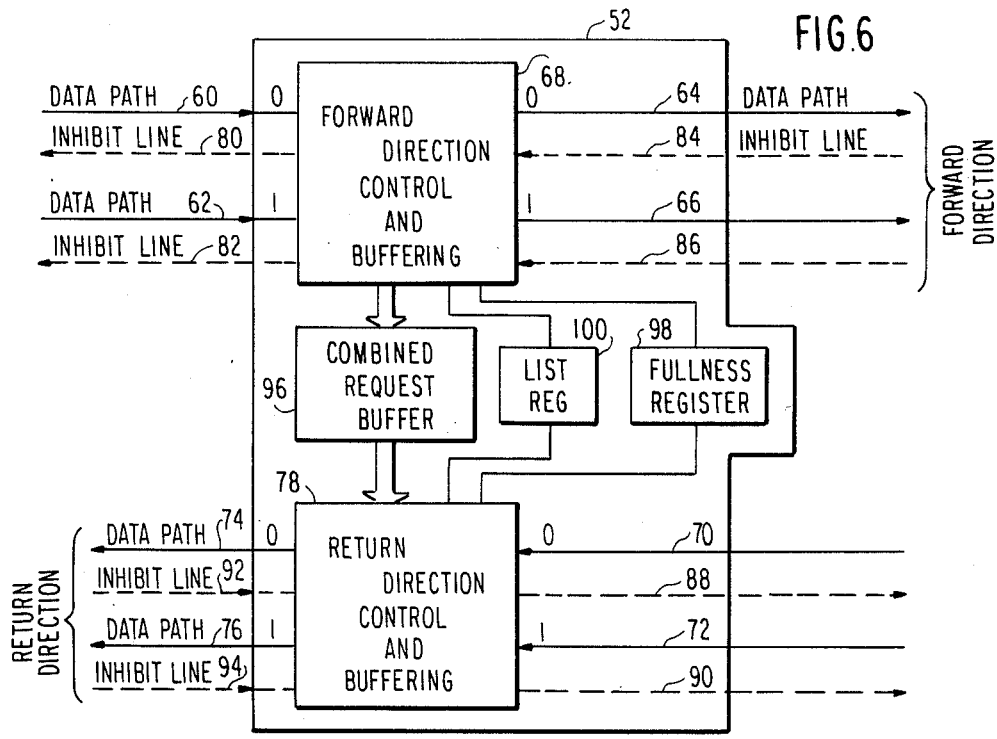
FIG. 6 is a schematic diagram of a switching node of the Delta network of the present invention.

Each node of the Delta network 50 has a structure schematically represented in FIG. 6. Control data is received in the forward direction on two forward data input paths 60 and 62 from the previous stage of nodes. The forward control data is received, controlled, possibly buffered and then switched to one of two forward output data paths 64 and 66. These functions are controlled by a forward direction control and buffering circuit 68 to be described in detail later. The forward data output paths are connected to the next stage in the Delta network 60. This structure is generally duplicated for control messages sent in the return direction by return data input paths 70 and 72 and return data output paths 74 and 76 connected by a return direction control and buffering circuit 78.

Each of the data paths 60 and 66 and 70–76 has an associated inhibit line going in the reverse direction to or from the same node in the neighboring stage. Whenever a control and buffering circuit 68 or 78 has filled its output buffers so that no more messages can currently be handled, it puts an active signal on both of its output inhibit lines 80 and 82 or 88 or 90. This inhibition indicates to both of the neighboring nodes on one side, which are possibly transmitting to that circuit 68 or 78, that no more messages should be transmitted. Thus when the forward direction control and buffering circuits 68 detects an active signal on inhibit line 84, it will not transmit control messages on the associated data paths 64. Likewise, when the return direction and control buffering circuit 78 detects an active inhibit signal on line 92, it will not transmit a return control message on the associated data path 74.

A combined request buffer 96 is accessible by both the forward and reverse direction control and buffering circuits 68 and 78 for the storage and subsequent retrieval of combined messages. A fullness register 98 keeps track of the number of messages currently being stored in the combined request buffer 96. The fullness register 98 is incremented by the forward direction control and buffering circuit 68 when it stores a message in the combined request buffer 96 and the return direction control and buffering circuit 78 decrements the fullness register 98 when it retrieves a message from the combined request buffer 96. The messages stored in the combined request buffer 96 are indexed by an identifier provided by the forward direction control and buffering circuit 68. There are only a finite number of allowed identifiers and the list register 100 keeps track of which identifiers are in use. If there are only 8 allowed identifiers, then the list register 100 could be an 8-bit register. The forward direction control and buffering circuit 68 would set the bit corresponding to an identifier indicating that it is being used for messages being stored in the combined request buffer 96. When the return direction control and buffering circuit 78 retrieves the last identified message from the combined request buffer 96, it resets the corresponding bit in the list register 100 to indicate that that identifier is now available.

Figure 7:
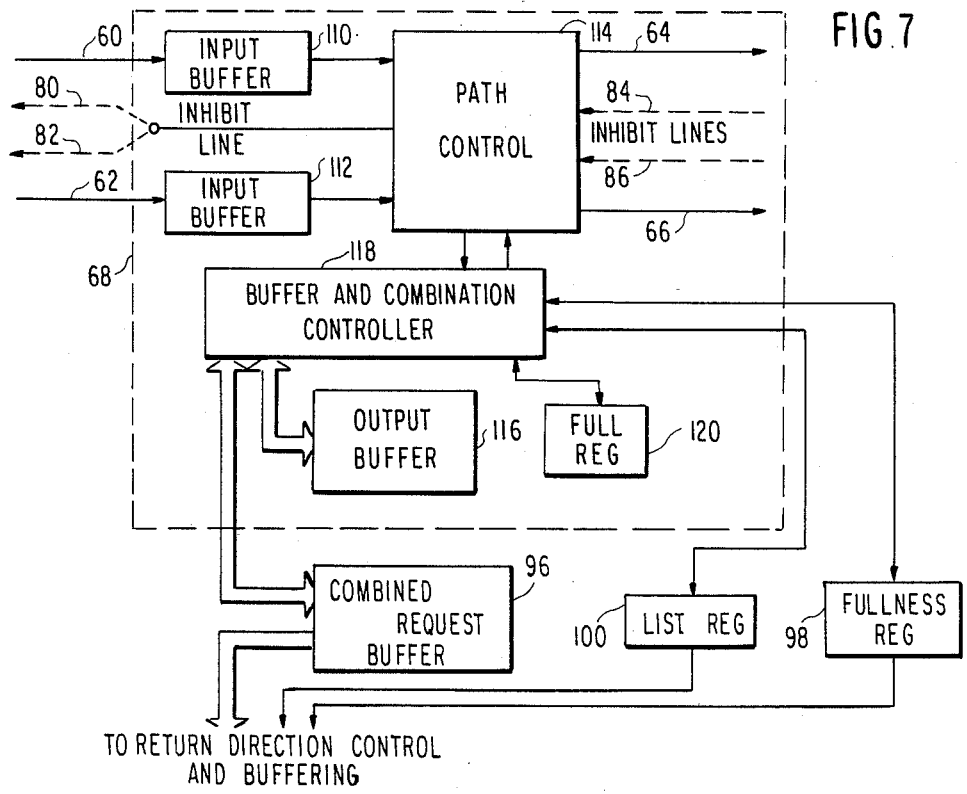
FIG. 7 is a more detailed schematic diagram of the forward direction components of the switching node of FIG. 6.

The forward direction control and buffering circuit 68 is shown in more detail in FIG. 7. Input buffers 110 and 112 are connected to the forward input data paths 60 and 62 and are of sufficient size to contain one control message $S^C_{ij}$ apiece. The input buffers 110 and 112 have a further function of modifying the address in the combined address field A. This can be easily accomplished by tying the output of the address bit to be modified to a zero value for the input buffer 110 and to a one value for the input buffer 112, regardless of the value of that bit input to the input buffer 110 or 112. For instance, in the previously described example for the 000(1) node, the left-most address bit is always output as a 1 from the input buffer 112.

A path control circuit 114 controls the routing of messages between the input buffers 110 and 112 and the forward output data paths 64 and 66 as well as the routing to and from an output buffer 116 controlled by a buffer and combination controller 118. Associated with the output buffer is a fullness register 120 which indicates the number of messages stored in the output buffer for transmission on the forward output data paths 64 and 66. When a message is received at the input buffer 110 or 112, the path control circuit reads the single bit of the address field indicating the direction of switching. At depth d, the message is intended for the forward data output path 64 if the bit $a_{d+1}=0$ and is intended for the data path 66 if $a_{d+1}=1$. The path control circuit 114 immediately forwards a message from the input buffer 110 or 112 to its indicated output path 64 or 66 if the output buffer 116 is empty, as indicated by the fullness register 120 and if the path 64 or 66 is available.

The path 64 or 66 is available if two conditions are satisfied. The inhibit line 84 or 86 associated with the output data path 64 or 66 must be off. Furthermore, the message in the input buffer 110 or 112 must be the only message in the input buffers 110 and 112 for the indicated path. That is, the other input buffer must either be empty or contain a message directed to the other output path. If, however, both input buffers 110 and 112 contain messages directed to the same output path 64 or 66, there is a conflict or contention for that output path. One method of solving the contention is to proceed with the combining operation to be described later. However, in order to minimize forwarding delays in the light traffic situation when the output buffer is empty, it is recommended that the contention be immediately resolved by the path control circuit 114. In the preferred resolution method, the path control 114 keeps track of which of the input buffers 110 and 112 has last forwarded a message to the output path 64 or 66. The input buffer 110 or 112 which was not the last to forward is given priority in the contention and its message is forwarded before the other. That is, the path control circuit 114 causes priority to alternate between the input buffers 110 and 112.

The output buffer 116 stores messages waiting to be forwarded on the output data paths 64 and 66. The output buffer 116 must be content addressable both for the remaining destination address part of the combined address field A, to be used in the combining process, and for the two addresses of the two output data paths 64 and 66. Furthermore, the output buffer 116 must operate as a first-in/first-out buffer for all of its contents addressed respectively to the two output data paths 64 and 66. These functions can be easily performed by dividing the output buffer 116 into two outpout buffers 116a and 116b, as shown in FIG. 8. Each of the output buffers 116a and 116b is dedicated to respective output data lines 64 and 66. Fullness registers 98a and 98b are associated with the respective divided output buffers 116a and 116b. Associated with each output buffer 116a or 116b is an H register 122a or 122b and a T register 124a or 124b. The H and T registers are used for pointers to control the first-in/first-out buffering function. The memory organization of an output buffer 116a or 116b is shown in FIG. 9. The buffer 116a or 116b consists of $n+1$ addressable storage locations, each storing one control message $S^C_{ij}$. The T register 124a or 124b points to the next storage location in the output buffer 116a or 116b in which a message is to be stored. The H register 122a or 122b points to the oldest stored messages which will be the next message to be retrieved. FIG. 9 illustrates 3 storage locations for 3 messages currently being stored in the buffer. When another message is stored in the output buffer 116a or 116b, the T register is decremented by 1. Likewise, when a message is retrieved, the H register 122a or 122b is decremented by 1. When either H or T is equal to 0, a decrement will produce a value of n for that pointer H or T, that is, the pointers wrap around. It is to be noted that when H=T after a message has been stored, then the associated output buffer 116a or 116b is full. However, when H=T after a message has been retrieved, then the associated buffer is empty.

A more detailed schematic showing the circuitry associated with the path control circuit 114 is illustrated in FIG. 10. Associated with each of the two input buffers 110 and 112 is a buffer status register 130 or 132 that contains two bits of information ($b_1,b_2$). The value of the first bit is $b_1=1$ if there is a message waiting in the associated input buffer 110 or 112. The second bit $b_2$ is taken from the bit of the address field A that is being used in this stage of the Delta network. That is, the second bit is $b_2=0$ if the control message is to switched to the output data path 64 and $b_2=1$ if it is to be switched to the output data path 66. Two additional registers 134 and 136 are associated with each of the output data lines 64 and 66 and indicate the source of the last message transmitted on that line. That is, the contents of the last message register 134 associated with the data output lines 64 is set to 0 if the last message transmitted on line 64 was received from data input line 60 and is set to 1 if the messages was received on data input line 62. The path control circuit 114 increments the fullness register 120a when a message intended to be transmitted on the output data line 64 is buffered in the output buffer 116a. When the buffered message is retrieved from the output buffer 116a and transmitted on the data output line 64, the path control circuit 114 decrements the fullness register 120a. Similar incrementing and decrementing is performed upon the fullness register 120b as messages are buffered in the output buffer 116b for transmission on the data output line 66.

The forwarding of messages onto the top data output line 64 will now be described. A similar explanation would, of course, apply to the bottom data output line 66. At most one control message is transmitted on the upper data output line 64 per control cycle. A message select flag is set when a message to be transmitted on this line has been selected. If no message has been selected, then the message select flag is reset. If the inhibit line 84 associated with the data output line 64 is active, then no messages can be transmitted. If the contents of the buffer status register 130 or 132 is detected to be $(b_1,b_2)=(1,0)$, then the path control circuit recognizes that a message has been received for transmission on an inhibited data output line. Instead, the path control circuit 114 forward the message from the respective input buffer 110 or 112 to the buffer and combination controller 118 for storage or combining.

If, however, the inhibit line 84 is not active, the fullness register 120a is interrogated through the buffering and combination controller 118 to determine if it contains a non-zero value, that is, that here are messages waiting in the output buffer 116a. If the fullness register 120a is greater than 0, then the next message the output buffer 116 is retrieved and the fullness register 120 is decremented. The last message register 134 is then updated according to the origin of this message and the message select flag is set.

If the output buffer 116a does not having waiting messages, indicated by an empty fullness register 120a, then messages in the input buffers 110 and 112 can possibly be immediately forwarded. A message in the input buffer 110 is immediately forwarded to the data output line 64 if either: (1) the last message register 134 is 0 and the contents of the buffer status register 130 are (1,0) or (2) the content of the last message register 134 is a 1, the upper buffer status register 130 contains (1,0) and the first bit $b_1$ of the lower buffer status register 132 is 0. Similarly, a message is transmitted from the lower input buffer 112 if either: (1) the content of the last message register 134 is 1 and the contents of the lower buffer status register 132 are (1,0), or (2) the last message register 134 is 0, the lower buffer status register 132 is (1,0) and the first bit $b_1$ of the upper buffer status register 130 is 0. If a message is to be sent under any of these conditions, then the message select flag is set. If however, either the upper or lower input buffers 110 or 112 have an incoming message which cannot be immediately forwarded because none of the above conditions are satisfied, then the message is forwarded to the buffer and combiantion controller 118.

The operation of the buffer and combination controller 118 will now be described as it buffers and possibly combines a message. The controller 118 receives a control message $S^C(A,C,T,D,\alpha,K)$ from the path control 114. It is assumed that the node 52 is a depth of d. The controller 118 takes the remaining bits of the combined address field A that designate the destination address, that is, $a_{d+1}, a_{d+2} \ldots$ and compares them with the corresponding bits of messages already stored in the output buffer 116. That is, the output buffer 116 is content addressable according to the field $a_{d+1}, a_{d+2} \ldots$. Since in the preferred implementation the output buffer comprises two output buffers 116a and 166b associated with the two output data paths 64 and 66, the first bit $a_{d+1}$ points to one or the other of these two output buffers 116a and 116b. These two buffers 116a and 116b are then individually content addressable to the remaining address bit or bits $a_{d+2}, a_{d+3} \ldots$. However, the two output buffers 116a and 116b are content addressable only between their respective T and H pointers for the valid messages currently stored therein. If no message is found with the correct bits, then the currently received control message is stored at the location pointed to by the T register 124a or 124b as the message $M_i=(A,C,T,D,\alpha,K)$. The T register 124a or 124b is decremented and the associated fullness register 120a or 120b is incremented. This completes the buffering operation and no message combining was performed.

If, however, a message was found with the correct address bits, it will have the form $M_i=(A_i, C_i,T_i,D_i,\alpha_i,K_i)$. It was the proper bits of the address $A_i$ that matched the corresponding bits of the address A. If the depth parameter of the stored message equals the depth of the node 52, that is, $D_i=d$, then the message $M_i$ has already been combined at this level. The combining process in this case, involves increasing the time parameters $T_i$ of the already stored message $M_i$ by the time parameter of the newly arrived message $S^C$, that is, $M_i=(A_i,C_i,T_i+T, D_i,\alpha_i,K_i)$ for the newly combined stored message. The incremented time parameter is the total time required to service all the tasks of all the combined control messages. When a control message $S^C$ is combined with an already combined message $M_i$, then a truncated version of the control message $S^C$ is stored in the combined request buffer 96 as a catalogued message $M^*=(A,T,D,\alpha;\alpha_i)$. In the present embodiment, the control message parameters C and K are not required when the messages are decombined so are not stored with the catalogued message $M^*$. The last parameter $\alpha_i$ has been taken from the already combined message $M_i$ and is one of the identifiers used to identify which catalogued messages $M^*$ are associated with a single combined message $M_i$ as well as to identify the message that will eventually be returned from the reservation processors 54.

Of course, whenever a catalogued message $M^*$ is stored in the combined request buffer 96, the buffer and combination controller 118 increments the associated fullness register 98. Once the control message $S^C$ has been combined into the buffered message $M_i$ and its associated catalogued message M* has been stored, the buffer and combination controller 118 is ready for the next cycle.

If the message $M_i$ found in the output buffer 116 has a depth parameter $D_i$ less than d, then the aleady buffered message $M_i$ has not previously been combined at this depth d. In this case, the controller 118 creates a newly combined message from $S^C$ and $M_i$ of the form $M_i=(A_i,C_i,T_i+T,D,\alpha',K_i+1)$. The identifier $\alpha'$ is a new identifier that is indicated as being currently unused in the list register 100. The list register 100 is then changed to indicate that the identifier $\alpha'$ is now in use. If no further identifiers are available, the inhibit lines 80 and 82 are set active to prevent the reception of further messages. For a newly combined message, two catalogued messages are stored in the combined request buffer 96 of the form $M_1^*=(A_i,T_i,D_i,\alpha_i;\alpha')$ and $M_2^*=(A,T,D,\alpha;\alpha')$. That is, both the control message $S^C$ and the already stored message $M_i$ have associated catalogued messages that are stored, both of which are catalogued by the same identifier $\alpha'$. This double stored requires that the fullness register 98 be incremented by 2. Whenever the fullness register 98 indicates that there is less than two slots unfilled in the combined request buffer 96, then the buffer and combination controller 118 causes the inhibit lines 80 and 82 to go active to prevent the further reception of messages that could perhaps cause the combined request buffer 96 to overflow.

It should be noted at this time that the choice of the parameters $A_i$, $C_i$ and $K_i$ for inclusion in the newly combined message $M_i$ was arbitrarily selected from the already stored but never combined message $M_i$. These parameters could equally well have been taken from the control message $S^C$. It is possible to set up a priority scheme in the control parameter C such that the message with the highest priority always retains its parameters upon combining. This is particularly useful when the control parameter C is being used as addressing information at the destination port. Of course, only one such set of addressing information can be transmitted in the control field $C_i$ in a combined message $M_i$.

It is preferred in the combining process that a message in the output buffer 116a or 116b not be involved in a combining operation if that message is already at the top of the queue. An attempt to combine the senior member of the queue is likely to result in a delay in the transmission of messages from the buffer. Accordingly, referring to FIG. 9, only those message located at or between the locations T+1 and H−1 are content addressable for the address bits $a_{d+1}, a_{d+2}, \ldots$.

The memory organization for the combined request buffer can be advantageously integrated with that of the list register 100 so as to completely utilize the available buffering capacity. A list register 100' contains one location for each of the identifiers $\alpha$. A usage bit indicates whether the associated identifier $\alpha$ is currently in use. The identifier itself needs not be stored but can simply be the address of the location. A length parameter indicates the number of catalogued messages in a combined request buffer 96' that are catalogued by the identifier $\alpha$. Finally, for every identifier $\alpha$, there is a pointer to a location of one of the catalogued messages in the combined request buffer 96'. The combined request buffer 96' is another memory having multiple locations. An occupancy bit indicates whether a location is presently being used for storage of a catalogued memory M*. The location further contains a pointer to another location in the combined request buffer 96' for another message associated with the identifier $\alpha$. The combined request buffer 96' can store catalogued messages M* for any combination of identifiers $\alpha$ in any combination of storage locations. The combined request buffer 96' is thus addressable by the identifier $\alpha$ which points to one of a series of catalogued messages. Whenever another catalogue message is stored in the combined request buffer 96' the string of pointers is traced to the last catalogued message, $M_3^*$ in the illustrated example. Then the occupancy bits of other locations are tested to see if those locations are available. When an available location is found, that address is then inserted into the pointer field of the location of the last catalogued message, the new catalogued message is stored in the pointed-location, the occupancy bit is changed to one and the length parameter in the list register 100 is incremented by one. It should be noted that in this scheme the second identifier $\alpha'$ in the catalogued message M* is redundant since this information is available from the string of pointers.

An alternate approach for setting and resetting the inhibit lines 80 and 82 will be described later.

With the structure for the nodes 52 as described above, control messages $S^C$ can either be immediately be forwarded from one node to another node at a different depth, the control message can be transmitted in uncombined form after temporary storage in the output buffer 116a or 116b, or a combined message can be transmitted from the output buffer 116a or 116b. Furthermore, control messages may be combined at different depths with corresponding catalogued message M* being left behind at the combined request buffer 96 at the various depths of combining.

The control message $S^C$ is eventually received at the reservation processor 54, illustrated in FIG. 12. It is immaterial to the reservation processor 54 if the control message $S^C$ is a combined message or an uncombined message. They are both treated the same. The received control message $S^C$ is stored in an input buffer 130. The address field A, the depth parameter D and the identifier $\alpha$ of the control message $S^C$ are immediately forwarded to an output buffer 132 for inclusion in the return message $S^R$. The control information C is forwarded to the output adaptor 32. If the output adaptor 32 has a cache memory and the control information C contains the address for the page of memory required from the bulk memory associated with the output adaptor 32, then the page can be pre-fetched into the cache memory along with its memory address for quick access when the connection through the cross-point switch 34 is finally completed.

A reservation processor unit 134 receives the time parameter T and the number of combining levels K from the input buffer 130.

The time T is the total time being requested, possibly for a number of combined messages. On the other hand, the number of combining levels K is associated with only one of the uncombined messages in the control message $S^C$. A system clock provides a real time signal t to the reservation processor unit 134. A register 136 contains the absolute time $t_{oc}$ for the beginning of the first available reservation. This time $t_{oc}$ is set by the reservation processor unit 134 but is always equal to or greater than the system clock time t. This function can be easily implemented by a comparison circuit.

The purpose of the reservation processor 134 is to calculate an absolute reservation time V for transmission back through the Delta network and for calculating new values of the available reservation time $t_{oc}$. The functional dependence of these two parameters depends upon another parameter $\Delta = (t + t_{min} + ZK) - t_{oc}$. The parameter t is the value of the system clock and $t_{oc}$ is the current value in the register 136. The parameter $t_{min}$ is a parameter of the system and represents the time required for the return message $S^R$ to traverse the Delta network 42 back to the input adaptor 30. This parameter is for the case where there has been no combining, and hence no decombining is required for the return message, and further assumes that there is no blockage at the nodes 52 for the return message. The parameter Z is the expected additional decombining delay for decombining at one node 52. Thus the product ZK is the total decombining delay expected for the one original message that has provided the levels of combining K and the control information C. Then the sum of $t + t_{min} + ZK$ is the expected time of arrival of the return message $S^R$ at the one input adaptor 30 that originated the one control message with which K and C are associated. If the expected time of arrival is later than the available reservation time $t_{oc}$, that is, $\Delta$ greater than 0, then the available reservation time $t_{oc}$ is too early to be usable and $\Delta$ represents a time that will be wasted until connection can be made. In this case, the time V transmitted the return message is set to $V = t_{oc} + \Delta$ which is the above mentioned arrival time at the input adaptor 30. In this case also, the available reservation time register 136 is incremented by the wasted time value $\Delta$ and the requested reservation time T. The new value of the available reservation time $t_{oc}$ is thus the time following the processing of all the tasks associated with the control message $S^C$.

If, however, the value of $\Delta$ is less than or equal to 0, then there is no wasted time $\Delta$. The time parameter V returned in return message $S^R$ is set to the current value $t_{oc}$ of the available reservation time register 136 and this register is then updated by the reservation time request T. Once the output buffer 132 has received the values of A, D, $\alpha$ and V, the return message $S^R(A,V,D,\alpha)$ is returned to the Delta network 50 for transmission in the reverse direction.

Figure 13:
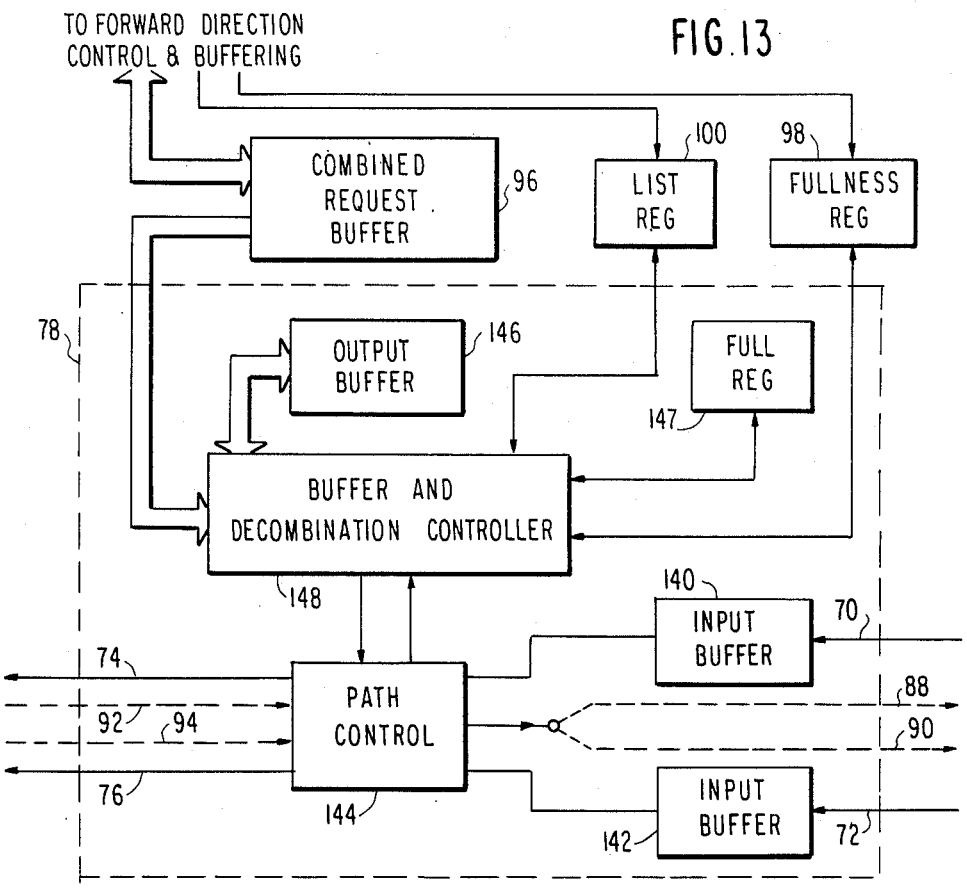
FIG. 13 is a schematic diagram of the return direction components of the switching node of FIG. 6.

The propagation of the return control message SR through the DELTA network 52 is very similar to the propagation of the forward control message $S^C$ through this same network. The return direction control and buffering circuit 78, illustrated in FIG. 13 is very similar to that of the forward direction control and buffering circuit 68 of FIG. 7. The switching between the return input data lines 70 and 72 and the return output data lines 74 and 76 is performed according to one bit of the combined address field A in the return message $S^R$. As mentioned previously, in the switching in the return direction, the bits in the combined address field are read from right to left. The returned messages are buffered in input buffers 140 and 142. A return path control circuit 144 controls the switching of return messages $S^R$ through the switch. An output buffer 146 is similar to the output buffer 116 except that it does not need to be content addressable but operates strictly as a first-in/first-out buffer. A fullness register 147 maintains a count of available slots in the output buffer 146. The output buffer 146 and 147 may be implemented as dual buffers and register, as shown in FIG. 8.

If the output buffer 146 has messages waiting to be transmitted, the path control circuit 144 receives those messages through a buffer and decombination controller 148 for transmission on the return data output lines 74 and 76 according to the proper bit in the address field A. For every message taken from the output buffer 146, an associated fullness register 148 is decremented. If the fullness register 148 is decremented when the inhibit lines 88 and 90 are active, the inhibition is removed. Just as in the case of the forward switching, the return messages are transmitted only when the required data output line 74 or 76 is available. If the output buffer 146 is empty, as indicated by its associated fullness register 148 then a message in the input buffer 140 or 142 is transmitted to the proper data output line 74 or 76 if that line is available and if the depth parameter D in the return message $S^R(A,V,D,\alpha)$ does not indicate that decombining is required at this depth, that is, if D does not equals d. If the return message $S^R$ cannot be forwarded immediately, then it is sent to the buffer and decombination controller 148.

The controller 148, upon receiving a return message from the path control circuit 144, stores that message in the output buffer 146 if D does not equal d. It then also increments the fullness register 148. When the fullness register 148 indicates that the output buffer 146 is full, the inhibit lines 88 and 90 are set active to inhibit the transmission of further return messages.

If the depth parameter D equals d in the control message received by the controller 148, then this return message must be decombined at this level. The return message is of the form $S^R = (A,V,d,\alpha)$. The combined request buffer 96 will have at least two catalogued messages $M_i^* = (A_i, T_i, D_i, \alpha_i; \alpha)$. The content addressability is made according to the identifier $\alpha$. These catalogued messages are taken out of the output buffer 146 in first-in/first-out order and are inserted into the output buffer 146 as multiple return messages of the form at $S^R = (A_i, V_i, D_i, \alpha_i)$ for the requisite sequence of i beginning at 1. The adjusted reservation time $V_i$ is sequentially calculated for the number of catalogued messages, namely, $V_1 = V$ and $V_{i+1} = V_i + T_i$. The effect is to allocate the reservation time V in the combined return message $S^R$ to the various decombined messages. Of course, as messages are decombined and put into the output buffer 116, the fullness register 120 must be properly incremented and the transferring must be stopped when it indicates that the output buffer 116 is full. In this case, the inhibit lines 88 and 90 are activated.

In this way, any combined return messages $S^R$ are decombined at the same lever and node at which the control message $S^C$ producing them had been combined. Furthermore, a single return message may be decombined at more than one depth if the depth parameter D in the catalogue message M* indicates the further need of decombining. In this way, return messages arrive back at the input adaptors 30 as single, uncombined return messages. The input adaptor 30 then uses the reservation time V contained in the return message $S^R$ as the time to cause the associated controller 40 to make the required cross-point connection in the cross-point switch 34. If, because of blockage on the return path or for other reasons, the reservation time V returned to an input adaptor 30 is earlier than the time at which it is received at that adaptor 30, no connection is made and the connection request must be resubmitted. At the end of the originally requested connection time T, the controller 40 must disconnect the cross-point because another cross-point controller is likely to make a conflicting connection based on another granted reservation.

An alternate method to setting the inhibit lines 80, 82, 88 and 90 will now be described. This method changes these lines only at the end of every cycle of transmissions between the nodes, at which time various buffers are checked to determine if sufficient space is available. The buffer and combination controller 118 (FIG. 7) checks the fullness registers 120a and 120b (FIG. 8) associated with the two output buffers 116a and 116b to determine that both buffers have at least two slots available. The controller 118 also checks the fullness register 98 associated with the combined request buffer 96 to determine if at least four slots are available. The buffer and combination controller 118 then sets the inhibit lines 80 and 82 if either of the two above conditions is not satisfied or resets them if both conditions are satisfied. The set or rest condition then continues for the next cycle, at the end of which the testing is repeated.

The buffer and decombination controller 148 checks each fullness register associated with each subbuffer of the output buffer 146, assuming the dual sub-buffer implementation of FIG. 8. Each subbuffer must have at least the number of slots available that is the greater of 2 or the maximum value length parameter in the list register 100' associated with the combined request buffer 96' (FIGS. 11 and 13). If these conditions are met, the buffer and decombination controller 148 resets the inhibit lines 88 and 90. Otherwise they are set active for the following period.

The previous description relies upon the calculation and transmission back to the input adaptor of the absolute reservation time V. An alternative approach is to instead calculate at the reservation processor 54 the reservation delay before the output adaptor 32 becomes available. The delay must be greater than the expected return delay ZK plus possibly an additional delay which accounts for typical blockage times. This typical blockage time delay can be tuned for particular systems. The new reservation delay is used to update a delay clock at the reservation processor which also decrements to a zero value so as to maintain a real-time delay indicator. When the reservation delay is transmitted back in the return message $S^R$, each node decrements this delay according to the time that it has actually delayed the return message, either for blockage delays, for buffering delays, or for normal forwarding delays. Thus when this delay reservation time arrives back at the input adaptor 30, it indicates the true delay before the controller 40 should make the required cross-point connection. Of course, if the reservation delay has been decremented to a negative value, it is too late to make the connection which must be submitted as another request. Reservation delays in combined returned messages are decombined in the same ways as were the reservation times $V_i$.

The previous description of the switching system of FIG. 3 had implicitly assumed that one class of devices attached to the input lines $I_0$–$I_3$ initiated the request for connection through the cross point switch 34 to another class of devices connected to the output lines $O_0$–$O_4$. The two classes of devices of such an asymmetrical system might be processors on the input lines and memories on the output lines. However, many computer systems form symmetrical systems in which any one device may request a connection to any other device. Such a system can be easily attached to the switching system of FIG. 3 by connecting the device to both an input line $I_i$ and an output line $O_i$. Of course, this requires corresponding input and output ports on the attached device. It should be recognized that there then exists two paths through the cross-point switch 34 between the two so attached devices $D_i$ and $D_j$. One path connects $I_i$ to $O_j$ and another path connects $I_j$ to $O_i$. According to the invention as described so far, these two cross-point connections are separately set by connection request appearing on the two input lines $I_i$ and $I_j$.

Figure 14:
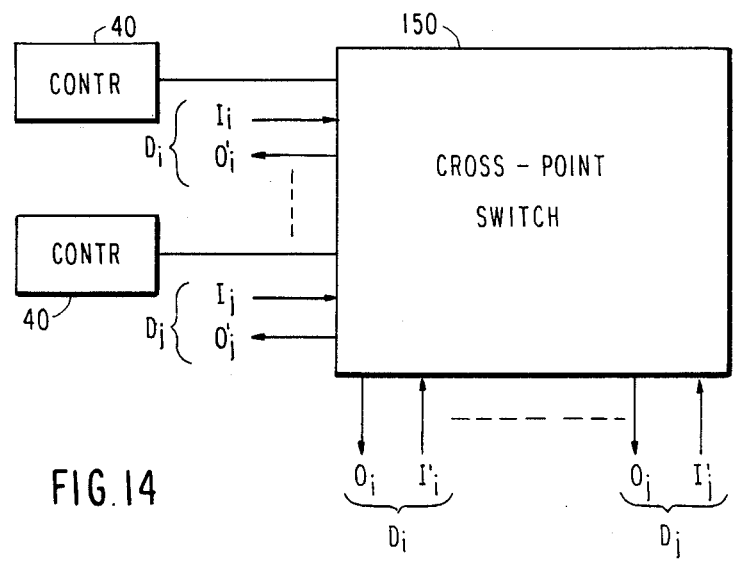
FIG. 14 is a connection diagram for a full-duplex crosspoint switch usable with this invention.

For full-duplex communication between the two devices $D_i$ and $D_j$, it is recommended that each device $D_i$ have two input ports $I_i$ and $I'_i$ to a cross-point switch 150, illustrated in FIG. 14 and similarly have two output lines $O'_i$ and $O_i$ from that switch 150. A full-duplex path is provided to the device $D_i$ by the two lines $I_i$ and $O'_i$ when the request for connection had been made by that device $D_i$. However, when the connection request had been made by another device $D_j$, the duplex path to the device $D_i$ is provided by the lines $I'_i$ and $O_i$. A single cross-point controller 40 associated with the input line $I_i$ controls the cross-point connections for both the input lines $I_i$ and the output lines $O'_i$. Obviously, the cross-point connections are between $I_i$ and $O_j$ and between $O'_i$ and $I'_j$. It is seen that the horizontal partitioning of the cross-point switch 150 is maintained.

The cross-point switch 150 required for the system of FIG. 14 is somewhat unusual in that some lines are for data transmission in one direction and other lines are for data transmission in the other direction. It may be preferable to divide the cross-point switch 150 into two cross-point switches 152 and 154, shown in FIG. 15. A single set of controllers 40 connected to the adaptors 30 control the cross-point connections on both switches 152 and 154. Each adaptor 30 has a source-side line and a destination-side line connected to the Delta network 42. It should be noted, however, that the cross-point switch 154 is vertically partitioned rather than horizontally partitioned, at least within the meaning of that term for FIG. 3 that horizontally partitioned cross-point arrays have the control lines parallel to the input lines. The advantage of the full-duplex design of FIG. 15 is that all data flow through the two cross-point switches 152 and 154 is unit-directional, thus allowing a simple design for the switches 152 and 154.

Figure 15:
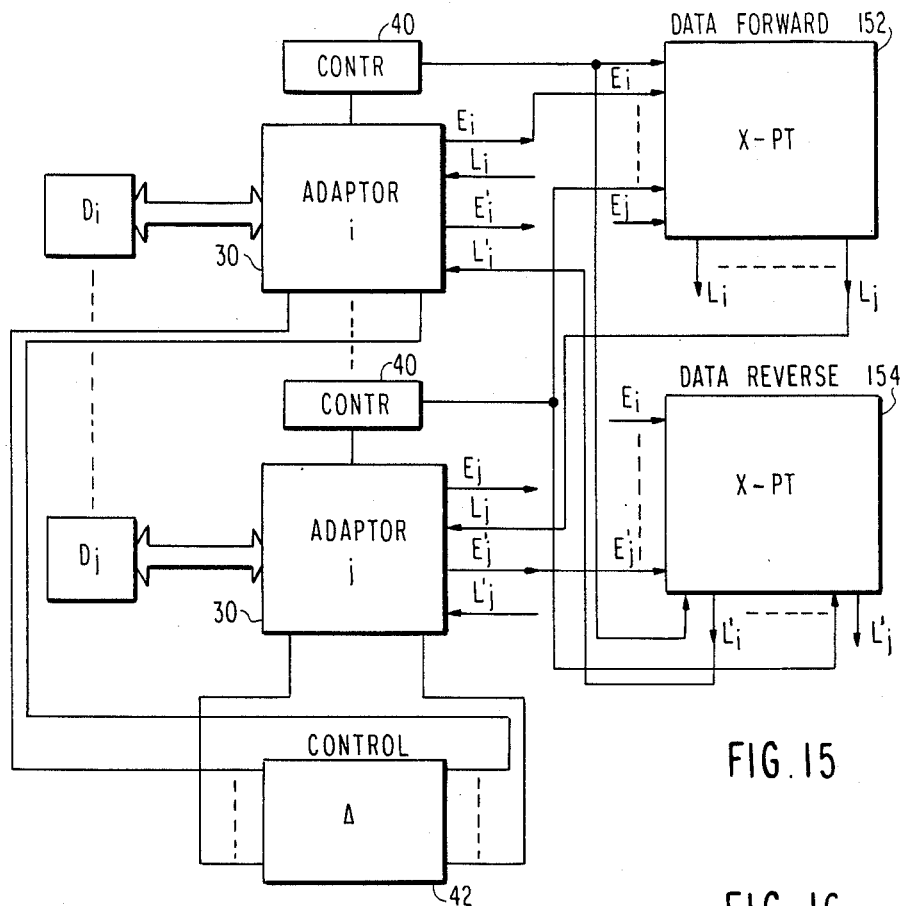
FIG. 15 is a alternate embodiment for the circuit of FIG. 14.

The circuitry of FIG. 15 assumes that the Delta network 42 is two-way, that is, return messages $S^R$ are sent back to the source device, $D_i$ in the example. If the Delta network 42 is one-way so that no return messages are generated and the cross-points are set on the destination side, then the forward cross-point array 152 would be vertically partitioned and the reverse array 154 would be horizontally partitioned, with a corresponding change in the control lines from the controllers 40.

Figure 16:
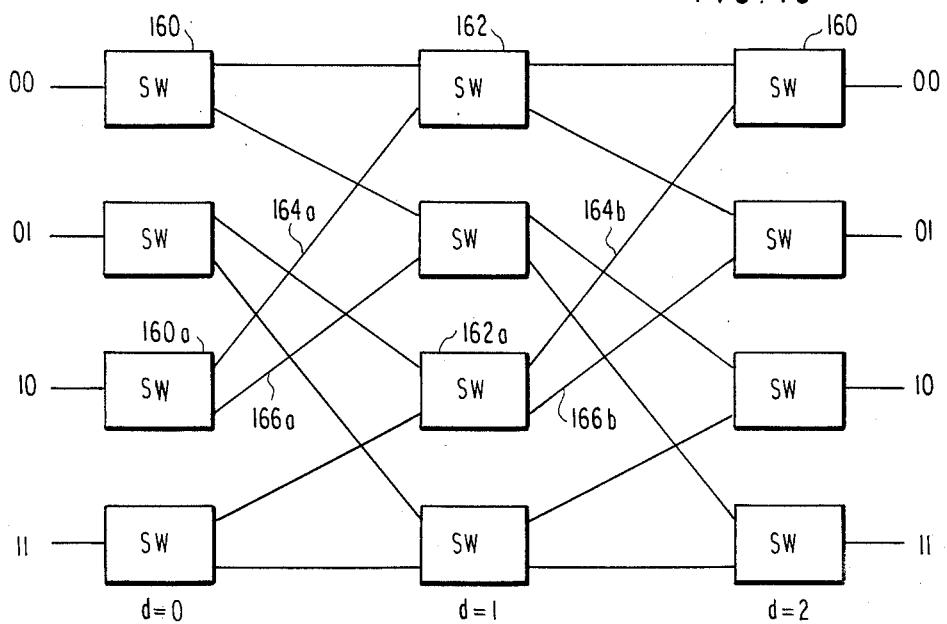
FIG. 16 is an illustration of a perfect shuffle network.
Figure 17:
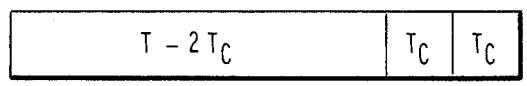
FIG. 17 is a timing diagram illustrating a multiplexed operation of an alternate embodiment of this invention.

The switching systems described to this point have required both a cross-point switch and a separate Delta network. However, it is possible to use a single cross-point switch for both of the switching functions. The cross-point switch is time-multiplexed so that for a fixed period it is operating as a cross-point swich; but in another fixed period, the cross-point switch is simulating a Delta network. This combination of functions can be obtained for a type of Delta network known as a perfect shuffle Delta network, an example of which is illustrated in FIG. 16. In the illustrated perfect shuffle network, the end stages at a depth d of 0 and 2 are composed of $1\times2$ switching nodes 160 while the middle stage at a depth of 1 is composed of $2\times2$ switching nodes 162. The important point for the perfect shuffle network is that the connections between the stages are the same regardless of the depth of the network. For instance, connections 164a and 166a from a node 160a at d=0 are identical to connections 164b and 166b from a corresponding node at d=1. Perfect shuffle networks are described in the previously cited technical article by Dias et al. Perfect shuffle networks and their use are further described by Stone in a technical article entitled "Parallel Processing with the Perfect Shuffle" appearing in IEEE Transactions on Computers, Vol. C-20, No. 2, February 1971 at pp. 153–161. A cross-point switch can simulate a perfect shuffle network because an adaptor connected to both an input and an output line from the cross-point switch can act as one of the nodes of the perfect shuffle network. The adaptor, however, is acting as the corresponding nodes for all the depths of the perfect shuffle network. But because of the constant interconnection pattern between the stages at the different depths, the switching is performed the same regardless of the simulated depth.

The use of a cross-point switch for simulating a perfect shuffle network for the forward propagation of the control message $S^C$ will now be described. The cross-point switch is multiplexed with a period of T. In the initial segment of the multiplexing period, data is transmitted through the cross-point switch for a period of $T-2T_C$. In this segment, the cross-point switch is being used in its normal fashion for the selective connection between any of the input and output lines. The determination of the connection is made by the transmission of the control messages $S^C$. The multiplexing period is further divided into two segments, each of length $T_C$. In each of these $T_C$ segments, forward control messages $S^C$ are transmitted from one adaptor to another, simulating the perfect shuffle network. For a particular adaptor, the cross-point connection or switching direction for each of the two $T_C$ periods are respectively the two connections dictated by the perfect shuffle network. These connections will not vary depending upon the depth but will vary for which of the four nodes arranged vertically in FIG. 16 is being simulated by the particular adaptor.

Figure 18:
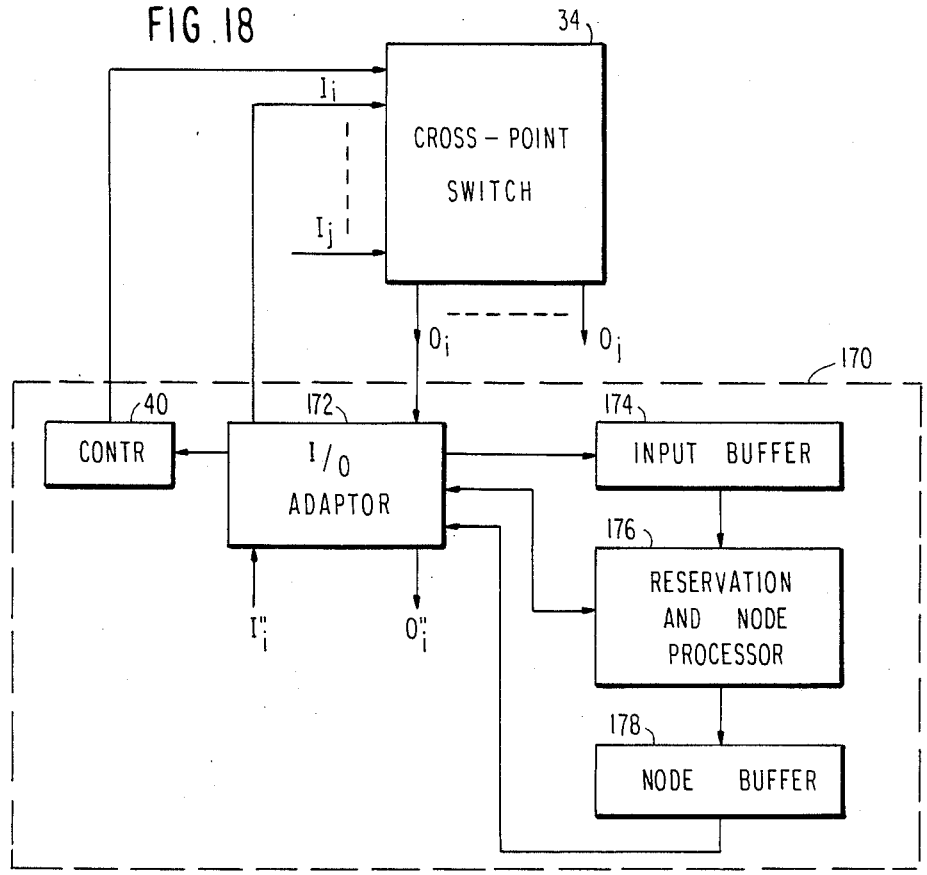
FIG. 18 is a block diagram of a multiplexed embodiment of the invention.

An apparatus for the multiplexed embodiment of the invention is shown in FIG. 18. The cross-point switch 34 can be of the same form as that of FIG. 3. Associated with each pair of input and output lines $I_i$ and $O_i$ is a node circuit 170 that includes the previously described cross-point controller 40 and an I/O adaptor 172. During the multiplex data period of $T-2T_C$, the I/O adaptor 172 acts as the input and output adaptors 30 and 32 of FIG. 3. The I/O adaptor 172, during this period, simply connects the input and output lines $I''_i$ and $O''_i$ from the attached devices to the corresponding input and output lines $I_i$ and $O_i$ to the cross-point switch 34. During this data period, the controller 40 is making the cross-point connection required for the data transmission. In the two control message segments $T_C$, the I/O adaptor 172 is possibly receiving control messages $S_C$ on the output line $O_i$ and immediately forwards them to an input buffer 174. If only one control message is transmitted in each of the segments $T_C$, then the buffer 174 has a capacity of two messages.

During the following data transmission period of $T-2T_C$, the control messages in the input buffer 174 are sequentially serviced by a reservation and node processor 176. The control message must contain two additional parameters, one indicating the depth of the node at which the control message is being received. The control message must also contain an indicator as to whether it is forward control message $S^C$ or a return message $S^R$. If the depth parameter indicates that the received control message is intended for a depth of 2, that is, the right hand side of the perfect shuffle network of FIG. 16, then the reservation and node processor 176 performs similar functions to the reservation processor 54 of FIG. 12. Additionally, the reservation and node processor 176, in this case, must change the depth and direction parameters in the control message period.

However, if the intended depth parameter indicates that further switching is required, such as would be the case with an intended depth of 0 or 1 in FIG. 16 for a forward message $S^C$, then the reservation and node processor 176 does not perform the reservation functions upon the message. Instead, the processor 176 associates with the control message a switching direction dependent upon the intended depth parameter and the address field in the control message. This switching indicator corresponds to one of the two control segments $T_C$ which in turn correspond to the two possible paths from the simulated node. In FIG. 16, the paths 164a and 164b represent one choice and the paths 166a and 166b represent the other choice. This switching indicator is also inserted when a control message $S^C$ is converted to a return message $S^R$, as described above for the reservation process. All the processed messages are then stored in a node buffer 178. The node buffer 178 is content addressable according to the switching indicator and operates as a first-in/first-out buffer on those messages. In the first control segment $T_C$, the senior message in the node buffer 178 directed in one switching direction is taken from the node buffer 178 and sent to the input line $I_i$. Similarly, during the second control segment $T_C$, the senior member in the node buffer 178 directed to the other switching direction, is taken from the buffer 178 and put on the input line $I_i$. During the two control segments $T_C$, the cross-point controller 30 is making the connections in the cross-point switch 34 corresponding to the two interconnections illustrated for that node in FIG. 16, for example, 164a or 164b and 166a or 166b. Thus control messages are being simultaneously received and transmitted by the node circuit 170 in each of the control segments $T_C$. Because the node circuit 170 is also acting as the entry node, additional messages are transmitted between the device attached to the input and output lines $I''_i$ and $O''_i$ and the reservation and node processor 176. A new request for a connection received on the input line $I''_i$ is immediately processed by the reservation and node processor 176 to put it in proper form for transmission to the next simulated node. Similarly, when the reservation and node processor 176 detects that a return message $S^R$ has been received at its final destination, that information is given immediately to the I/O adaptor 172 for use in a subsequent data transmission segment.

It should be noted that the entire path through the perfect shuffle network does not need to be simulated if in fact the control message $S^C$ or the return message $S^R$ has been received at the node circuit 170 which is its final destination.

This shortening of the path through the perfect shuffle network requires that the complete addresses be maintained in the address field A.

Although the cross-point switch 34 could be used for the immediate transmission of the control message across the entire network, there is no guarantee that two such messages would be simultaneously broadcast to the same destination. This situation is not possible for the time multiplexing of the two control segments TC of the described method.

The previous description applied to transmission of messages in only one direction across the perfect shuffle network. In order to use the node circuit 170 to simulate the perfect shuffle network in both directions, two additional control segments $T_C$ must be included in the multiplexing period. In two of the $T_C$ segments, control messages $S_C$ are being forwarded in one direction and in the other two $T_C$ segments the return messages are being forwarded in the reverse direction. the cross-point controller 40 and the node buffer 178 must then allow for four switching directions and the input buffer 174 must accept four messages.

Figure 19:
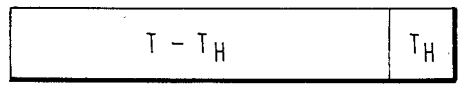
FIG. 19 is a timing diagram for a hierarchical method for sending control messages.

The structure of the Delta control network can be advantageously combined with another time multiplexing method to produce a hierarchical control path. An example of circuitry usable with the hierarchical method is the switching system of FIG. 15. The time sequence is simply shown in FIG. 19. For a time $T-T_H$, the cross-point switch is used for data transmission. At fixed times, for a period $T_H$, the data transmission is stopped. Any adaptor, which at that time, desires an additional reservation for a connection, transmits similar connection requests $S^C$ over both the Delta network and also over the cross-point switch. That is, each adaptor ignores possible contention from other adaptors and causes its controller to make the cross-point connection for the control message $S_C$, it makes the reservation and returns the confirmation message $S^R$ over the cross-point array to the requesting adaptor.

If a contention situation exists, then two or more adaptors will be attempting to simultaneously send requests $S^C$ over the cross-point array. Both connections are made and the two messages both become garbled. The destination adaptor cannot act on the garbled messages so that the messages over the cross-point array are ignored. However, similar messages are being transmitted over the Delta network. The Delta network, as previously described, can resolve contention so that both conflicting control messages will eventually be received over the Delta network. In order to prevent two request messages for the same request from being acted upon, one received over the cross-point array and one over the Delta network, the two control messages, sent on the different routes, each contains a same unique identifier. The destination adaptor, receiving a control message over the Delta network, compares the identifier with identifiers received over a time representing the maximum delay in the Delta network. Once a source adaptor has transmitted a request over the cross-point array, it continues to transmit some signal for the duration of the time $T_H$. This continued broadcasting prevents the successful receipt of two control messages in the same period $T_H$.

This hierarchical process allows for very quick connections to be made over the cross-pont array in light traffic situations but assures that the control message is eventually received over the Delta networking regardless of traffic conditions.

Having thus described my invention, what I claim as new, and desire to secure by Letters Patent is:

1. A method for transmitting data between source adaptors and destination adaptors via a cross-point array, comprising the steps of:

transmitting data from at least one of said source adaptors to a corresponding designated destination adaptor over said cross-point array;

interrupting said transmitting of data for a first predetermined time period;

transmitting a connection request from each of said source adaptors having a connection request over said cross-point array to a one of said destination adaptors indicated by the respective connections requests without consideration of contention in said cross-point array with connection requests transmitted over said cross-point array by other ones of said source adaptors, each of said connection requests containing an indentifier indicative of the source adaptor from which it is transmitted, said cross-point array being a fast but not guaranteed path for said connection requests;

returning from each destination adaptor receiving an ungarbled connection request from one of said source adaptors over said cross-point array a confirmation message to the source adaptor which transmitted the connection request;

for each connection request transmitted over said cross-point array, transmitting a similar connection request over a Delta network, said Delta network being a slower but guaranteed path for said connection requests;

resolving any contentions between connection requests in said Delta network such that each said connection request will reach the intended destination adaptor;

comparing in each destination adaptor receiving a connection request over said Delta network the identifier contained therein with identifiers of any connection request received over said cross-point array within a preceding second predetermined time period, within said first time period; and ignoring in each destination adaptor connection requests received over said Delta network having an identifier the same as a connection request received over said cross-point array within said second time period, whereby, by transmitting said connection requests over both said cross-point array as a fast but not guaranteed path and over said Delta network as a slower but guaranteed path, an average response time for data transmission approaches a response time attained if all connection requests were transmitted only over said cross-point array with no interference.

2. The method for transmitting data of claim 1, wherein said second predetermined time period is substantially equal to a maximum delay time through said Delta network.

3. The method for transmitting data of claim 1, further comprising the step of transmitting over said cross-point array, from each said source adaptor transmitting a connection request, a signal for any remaining duration of said first time period for preventing receipt of two connection requests from the same source adaptor during said first time period.

4. The method for transmitting data of claim 1, wherein said step of resolving any contentions comprises:

storing connection requests in a plurality of respective input buffers;

determining which of said input buffers has last forwarded a connection request;

forwarding the connection request contained in said input buffer having last forwarded a connection request.

5. The method for transmitting data of claim 1, wherein said step of resolving any contentions comprises combining connection requests from two different source adaptors for the same destination adaptor into a single message.

6. The method for transmitting data of claim 5, wherein said step of combining connection request comprises the steps of:

receiving and storing at least two reservation request, each of said reservation requests including an address of a destination adaptor, a requested time of service, and a control message;

comparing the destination adaptor addresses of each of said reservation request;

for at least some of said reservation requests having the same destination address, combining said reservation requests into a single reservation request including the control messages of the reservation requests being combined and a requested time of service equal to the sum of the times of service of the two reservations requests being combined.

7. The method for transmitting data of claim 6, further comprising the step of exempting an oldest reservation request from said step of combining.

* * * * *